US005621952A

United States Patent [19]
Frano

[11] Patent Number: 5,621,952
[45] Date of Patent: Apr. 22, 1997

[54] CORD CLOSURE

[75] Inventor: Frank Frano, Hoffman Estates, Ill.

[73] Assignee: Illinois Tool Works Inc., Glenview, Ill.

[21] Appl. No.: 533,256

[22] Filed: Sep. 25, 1995

[51] Int. Cl.⁶ .................................................. F16G 11/00
[52] U.S. Cl. .................... 24/115 G; 24/136 L; 24/136 R
[58] Field of Search ........................... 24/115 G, 115 H, 24/115 N, 136 L, 712.1, 136 R; 439/729, 817, 819

[56] References Cited

U.S. PATENT DOCUMENTS

| 4,453,292 | 6/1984 | Bakker | 24/115 G |
| 4,811,466 | 3/1989 | Zubli | 24/136 L X |
| 5,197,166 | 3/1993 | Meier et al. | 24/115 |

FOREIGN PATENT DOCUMENTS

| 0013693 | 8/1980 | European Pat. Off. | 24/115 G |
| 0229883 | 7/1987 | European Pat. Off. | 24/115 G |

Primary Examiner—Peter M. Cuomo
Assistant Examiner—Hanh V. Tran
Attorney, Agent, or Firm—Schwartz & Weinrieb

[57] ABSTRACT

A cord closure having a housing with an open end, a surrounding side wall and a closed end which forms a cavity for receiving a plunger. The plunger has a body with a throughhole alignable with holes formed through opposing sides of the housing and a stem extending from a shoulder portion of the body with a resilient retaining member on a distal end portion of the stem. A bias spring is disposed about the stem of the plunger and is releasably retained in compression on the plunger between the shoulder portion of the body and the resilient retaining member. At least a portion of the body and the stem of the plunger are reciprocally disposable in the cavity so that the throughhole of the plunger is alignable with the hole formed through opposing sides of the housing to permit threading of a cord through the aligned holes of the cord closure without the bias spring urging the plunger away from the housing. The housing includes a release means disposed in the closed end of the cavity for engaging the resilient retaining member to release the bias spring from the releasable retaining member when the plunger is depressed into the cavity of the housing whereafter the bias spring urges the plunger away from the housing to engage and retain the cord threaded through the holes of the cord closure.

18 Claims, 2 Drawing Sheets

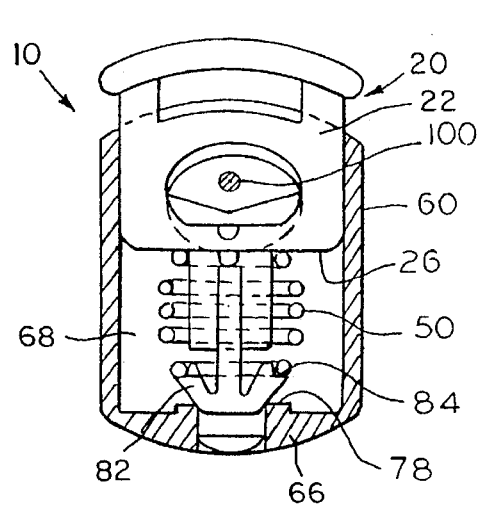
FIG.3
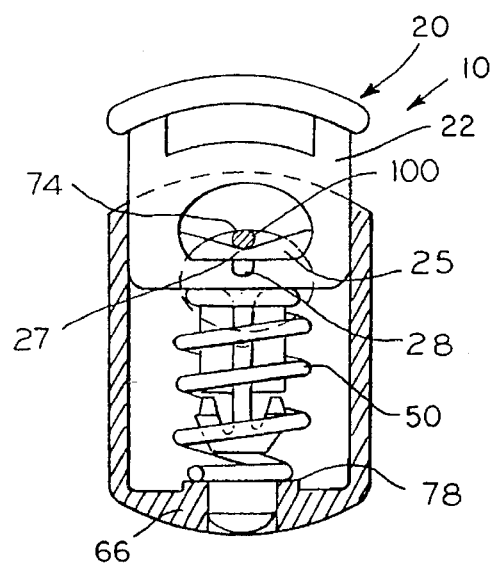
FIG.4
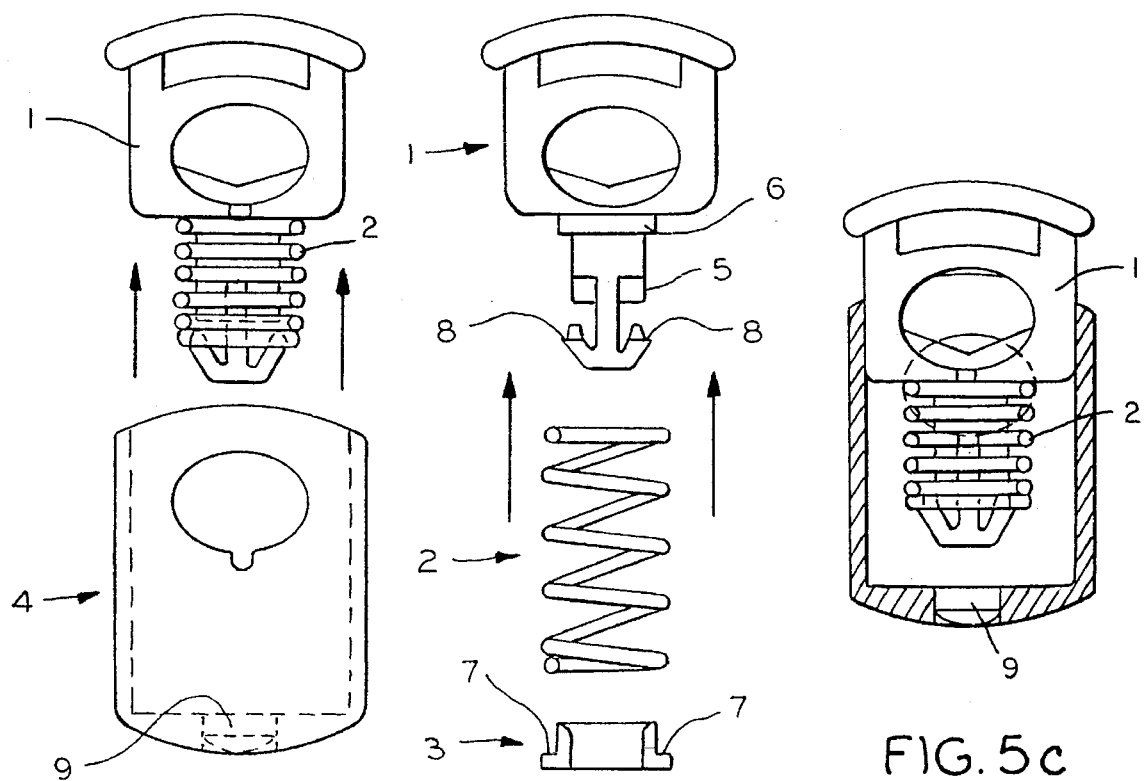
FIG.5b PRIOR ART
FIG.5a PRIOR ART
FIG.5c PRIOR ART

CORD CLOSURE

BACKGROUND OF THE INVENTION

The invention generally relates to a releasable cord clamping or closure device, and more specifically to a spring actuated cord closure having a plunger with a throughhole reciprocatingly disposed and retained in a housing cavity with a hole through opposing sides wherein the spring is initially retained in compression on the plunger to facilitate alignment of the holes in the cord closure for threading the cord therethrough without the spring urging the plunger away from the housing.

Releasable cord fastening devices have many well known applications including the fastening of draw strings on sleeping bags, backpacks, jacket hoods, wastebands, and other garments resulting in enormous success in the market place. The device typically includes a plunger with a throughhole reciprocally disposed and retained in a housing cavity with holes through opposing sides thereof wherein a bias spring urges the plunger away from the housing to engage and securely retain a cord threaded through the throughhole of the plunger and the holes of the housing. The cord is released by depressing the plunger relative to the housing against the bias of the spring to align the holes thereby permitting the cord to be drawn or threaded without obstruction through the holes. Initial threading of the cord through the holes of the device likewise requires depressing the plunger relative to the housing to align the holes. Not unexpectedly, repeated manual depressing or actuation of the fastening device for threading the cord through the holes as in a garment or other production line is painstaking work which gives rise to muscle fatigue and is a suspected cause of debilitating maladies like carpel tunnel syndrome.

To overcome the problems resulting from repeated manual actuation of the cord fastening devices or closures, prior an cord closures have provided a sub-assembly including a plunger with a retaining member which initially retains the spring under compression on the plunger so that the plunger can be freely positioned relative to the housing to align the holes of the closure device without the spring urging the plunger away from the housing. FIG. 5a. is a side view of an unassembled prior art cord closure sub-assembly and housing including a plunger 1, a cylindrical helical coil spring 2 and a retaining member 3. FIG. 5b is a side view of an assembled prior art sub-assembly disposable in a housing 4. The bias spring is disposed about a stem 5 on the plunger 1 and one end of which is seated on a neck 6 of the plunger whereabout the spring is preferably fictionally retained to secure the spring during assembly. An opposing end of the spring is seated on a shoulder 7 of the retaining member, which preferably has a collar for centering and frictionally retaining the spring during assembly, and the retaining member is disposed over and seated on shoulders 8 of resilient prongs of the stem to retain the spring in compression on the plunger. FIG. 5c is a side view of the prior an cord closure of FIG. 5a wherein the spring is retained under compression on the plunger by the retaining member so that holes in the plunger and housing may be readily aligned without influence from the spring to permit threading of a cord through the aligned holes of the cord closure. The spring is released from the plunger by depressing the plunger to drive the resilient prongs into a bore in a closed end of the housing. Edge portions of the bore urge the resilient prongs toward each other to permit the retaining member and spring to pass around the prongs and to seat on the closed end of the housing wherein the compressed spring urges the plunger away from the housing to engage and retain the cord.

The prior art cord fastening device or closure however has many disadvantages including the additional cost of the retaining member and assembly thereof. Further, assembly of the spring about the stem of the plunger and retaining of the compressed spring thereon with the retaining member is a tedious assembly procedure due to the tendency of the spring and the retaining member to separate from the plunger. This problem can be overcome in part by frictionally retaining one end of the spring about the neck of the plunger and the other end of the spring about the collar of the retaining member, but this solution requires additional structure on the plunger and on the retaining member, namely the neck and the collar, resulting in still higher costs, and does not always prevent separation of the components. Moreover, the dimensions of the retaining member and prongs must be made to within narrow tolerances to ensure reliable release of the compressed spring from the plunger further increasing the expense of the device.

In view of the discussion above, there exists a demonstrated need for an advancement in the art of cord fastening or closure devices. It is therefore an object of the present invention to provide a novel cord closure.

It is another object of the invention to provide a novel cord closure with a compressed spring retained on a plunger to form a sub-assembly which is reciprocally disposable in a cavity of a housing so that a throughhole in the plunger may be readily aligned with holes in the housing without influence from the bias spring to permit threading of a cord through the aligned holes of the cord closure.

It is a further object of the invention to provide a novel cord closure that is economical, requires fewer components, is relatively simple to assemble, and is reliable.

Accordingly, the present invention is directed toward a novel cord closure comprising a housing having an open end, a surrounding side wall and a closed end which forms a cavity for receiving a plunger. The plunger has a body with a throughhole which is alignable with holes formed through opposing sides of the surrounding side wall of the housing. The plunger also has a stem extending from a shoulder portion of the body and has a resilient retaining member on a distal end portion away from the body. A bias spring is disposed about the stem of the plunger and is releasably retained in compression on the plunger between the shoulder portion of the body and the resilient retaining member. At least a portion of the body and the stem of the plunger are reciprocally disposable in the cavity so that the throughhole of the plunger is alignable with the hole formed through opposing sides of the housing to permit threading of a cord through the aligned holes of the cord closure without the bias spring urging the plunger away from the housing. The housing includes a release means disposed in the closed end of the cavity for engaging the resilient retaining member to release the bias spring from the releasable retaining member when the plunger is depressed into the cavity of the housing whereafter the bias spring urges the plunger away from the housing to engage and retain the cord threaded through the holes of the cord closure. In one embodiment, the resilient retaining member includes a pair of resilient prongs having a shoulder portion wherein the bias spring is releasably retained in compression on the plunger between the shoulder portion of the body and the shoulder portion of the resilient prongs. The bias spring is a helical coil spring with at least one tapered end which is seated on the shoulder portion of the resilient prongs when the bias spring is releasably retained in compression on the plunger. The resilient prongs may each have a bevelled outer side portion and a flange on an inner portion of the shoulder for aligning the bias spring on the shoulder portion of the resilient prongs when the bias spring is retained in compression on the plunger. In one embodiment, the release means is a bore in the closed end of the cavity with edge portions engageable with an outer side portion, preferably bevelled outer side portions, of the resilient prongs to urge the prongs toward each other for releasing the bias spring from the shoulder portion of the resilient prongs when the plunger is depressed into the cavity of the housing.

These and other objects, features and advantages of the present invention will become more fully apparent upon consideration of the following Detailed Description of the Invention with the accompanying drawings in which like structure and steps are referenced by corresponding numerals and indicators.

BRIEF DESCRIPTION OF THE DRAWINGS

FIG. 2c is a side view of the plunger according to the embodiment of FIG. 2a.

FIG. 3 is a partial sectional view of an assembled cord closure according to the embodiment of FIG. 1 wherein the sub-assembly is reciprocatingly disposed in the cavity of the housing so that holes in the plunger and housing may be readily aligned without influence from the bias spring to permit threading of a cord through the aligned holes of the cord closure.

FIG. 4 is a partial sectional view of an assembled cord closure according to the embodiment of FIG. 1 wherein the bias spring is retained in compression between the housing and the plunger to bias the plunger away from the housing to engage and retain a cord threaded through the holes of the cord closure.

FIG. 5a is an unassembled prior art cord closure including a subassembly reciprocatingly disposable in a housing.

FIG. 5b is a side view of an assembled prior art sub-assembly reciprocatingly disposable a housing.

FIG. 5c is a side view of the prior art cord closure of FIG. 5a wherein the spring is retained under compression on the plunger by the retaining member so that holes in the plunger and housing may be readily aligned without influence from the spring to permit threading of a cord through the aligned holes of the cord closure.

DETAILED DESCRIPTION OF THE INVENTION

Figure 1:
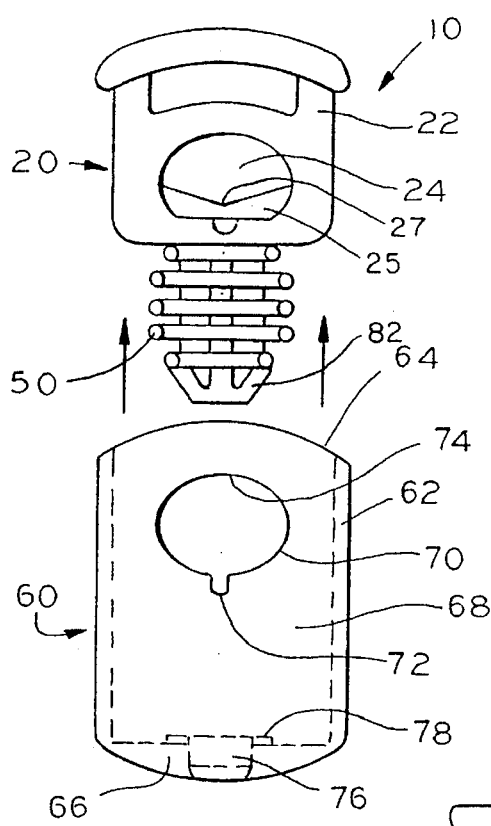
FIG. 1 is a side view of a partially assembled cord closure according to one embodiment of the present invention including a plunger member and bias spring sub-assembly which has a portion reciprocatingly disposable in a cavity of a housing.

FIG. 1 is a side view of a partially assembled cord closure 10 according to one embodiment of the present invention comprising a plunger member 20 and a bias spring 50 configured as a sub-assembly wherein the bias spring is retained in compression on the plunger, a portion of which is reciprocatingly retainable in a cavity 68, illustrated by phantom lines, of a housing 60. The housing includes a surrounding side wall 62 with an open end 64 and a closed end 66 which forms the cavity. A hole 70 is formed through opposing sides of the surrounding side wall 62 through which a cord may be threaded, and each hole includes a slot 72 disposed on a lower portion of the hole toward the closed end 66 of the housing. The closed end of the housing also includes a release means which may be formed of a bore 76, or at least two protruding portions 78, which may be an annular collar, or a combination of both the bore and protrusions or annular collar as further discussed below.

Figure 2A:
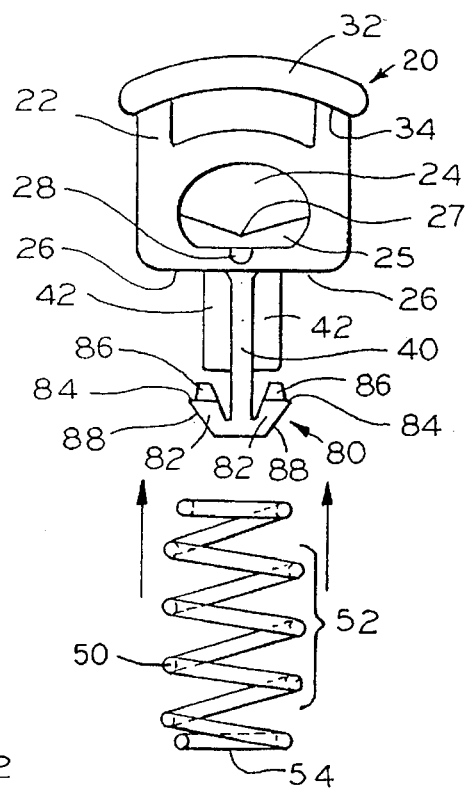
FIG. 2a is a side view of an unassembled plunger and bias spring sub-assembly of the cord closure according to the embodiment of FIG. 1.
Figure 2C:
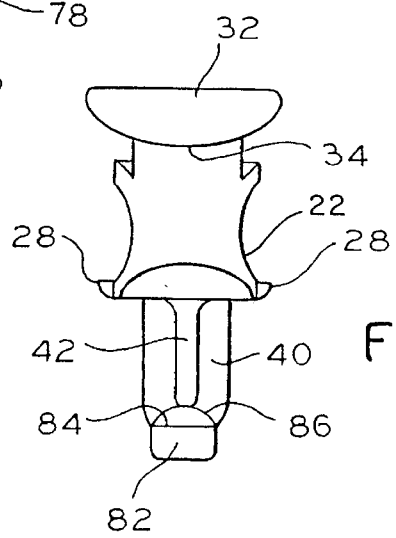
Figure 2D:
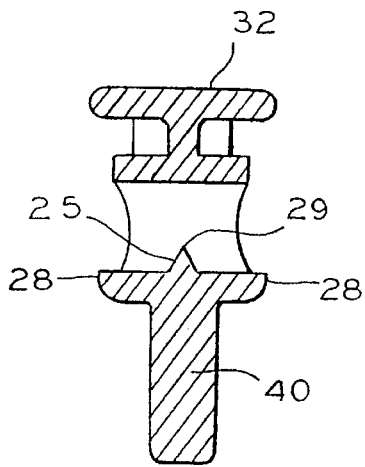
FIG. 2d is a sectional side view of the plunger according to the embodiment of FIG. 2c.
Figure 2B:
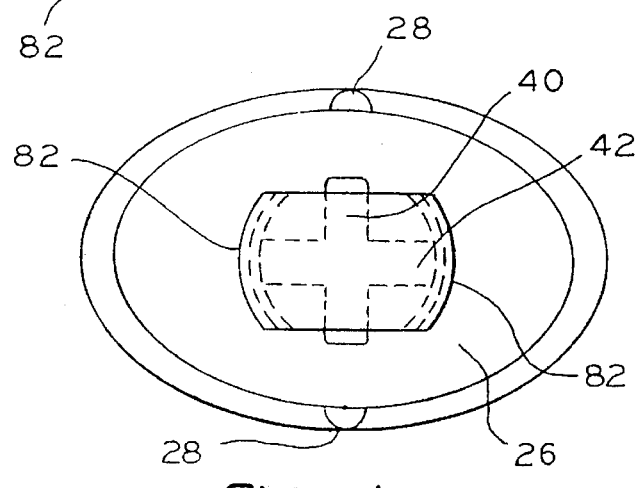
FIG. 2b is an enlarged end view of the plunger according to the embodiment of FIG. 1 when viewed in the direction of the arrows.

FIG. 2a is a side view of an unassembled plunger 20 and bias spring 50 sub-assembly according to the embodiment of FIG. 1. The plunger includes a body 22 with a throughhole 24 and a stem 40 extending from a shoulder portion 26 of the body. In an alternative embodiment, the shoulder 26 may be formed on a protruding neck portion of the body. FIG. 2b is an enlarged end view of the plunger according to the embodiment of FIG. 1, viewed in the direction of the arrows, which illustrates that at least a portion of the body has an oval or elliptical cross-sectional dimension which is complimentary to the cross-sectional dimension of at least a portion of the cavity 68 to permit the plunger to be reciprocatingly disposed in the housing. Other embodiments may have a body and plunger with complementary cross-sectional dimensions, including cylindrical and other geometrical cross-sectional shapes, which provide reciprocating action between at least a portion of the plunger and the housing to permit alignment of the throughhole 24 with the holes 70 and engagement and retention of the cord. FIG. 2c is a side view and FIG. 2d is a sectional side view of the plunger according to the embodiment of FIG. 1 wherein the body is shown to include two opposing ribs 28 disposed below a lower portion of the throughhole 24. Each rib 28 extends beyond the outermost portion of the body which is reciprocatingly disposable in the cavity. The ribs extend through the corresponding holes 70 in the opposing sides of the housing when plunger is disposed in the cavity wherein the plunger is retained in the housing by the ribs 28 engaging an upper portion 74 of the holes when the plunger is urged away from the housing. In an alternative embodiment, the body 22 includes a cord engaging member 25 disposed on a medial portion of the throughhole 24 proximate the stem. The cord engaging member 25 may have a central saddle portion 27 and a bevelled upper edge 29 for centering and securely engaging the cord as further discussed below. The body may also include a ergonomically shaped head or cap 32 which preferably extends over the portion of the body reciprocatingly disposed in the cavity and has an undersurface 34 which conforms in shape with an outer edge of the open end of the housing to prevent foreign objects from entering the cavity and to facilitate depressing or actuating the plunger as further discussed below.

The stem 40 includes a resilient retaining member 80 disposed on a distal end portion of the stem away from the body 22. In the exemplary embodiment, the stem 40 includes lateral support members 42 for strength, and the releasable retaining member 80 includes opposing resilient prongs 82 each having a shoulder portion 84 and a flange 86 on an inner portion of the shoulder 84. In the exemplary embodiment, the bias spring 50 is a helical coil spring wherein at least the body portion 52 intermediate the end portions of the spring has a cross-sectional diameter larger than the cross-sectional diameter of the resilient retaining member 80 so that the spring may be compressed and expanded while disposed about the stem and resilient retaining member. At least one end 54 of the spring has a concentrically tapered coil which provides a reduced cross-sectional diameter of the spring end relative to the cross-sectional diameter of the resilient retaining member 80. FIG. 1 shows the plunger 20 and the bias spring 50 assembled in the pre-assembly configuration wherein the bias spring is retained in compression on the plunger 20. The bias spring 50 is disposed about the stem 40 wherein one end of the bias spring is seated on the shoulder 26 of the body and the tapered end of the compressed bias spring is seated on the shoulders 84 of the resilient prongs. The flange members 86 help keep the compressed bias spring centered on the shoulders of the resilient prongs. In order to dispose the bias spring about the stem, the resilient prongs 82 must be urged toward each other to permit the tapered end of the spring to pass around the resilient prongs. In one embodiment, the resilient prongs have a bevelled outer side portion 88 to facilitate deforming the prongs to permit passage of the tapered end of the bias spring around the resilient prongs as further discussed below. In the exemplary embodiment, both ends of the bias spring are tapered to facilitate assembly of the plunger and spring by reducing the extent to which the spring must be oriented prior to assembly and for retaining at least one end of the bias spring on the stem before the spring is compressed. In an alternative embodiment, the stem and resilient retaining member may be comprised of at least two resilient legs with a shoulder portion at a distal end of each leg away from the body 22 wherein the tapered end of the bias spring is seated on the shoulder portion of the legs which also help center the bias spring.

FIG. 3 is a partial sectional view of an assembled cord closure according to the embodiment of FIG. 1 wherein the sub-assembly with the bias spring 50 retained in compression on the plunger, between the shoulder 26 of the body and the shoulder 84 of the prongs, is reciprocatingly disposed in the cavity of the housing 60 so that holes in the plunger and housing may be readily aligned without influence from the spring to permit threading of a cord through the aligned holes of the cord 100 closure. In the illustrated configuration, the plunger and bias spring sub-assembly may be reciprocatingly positioned along an axial dimension relative to the housing, and the sub-assembly is retained in the housing by the ribs 28 engaging the upper portion 74 of the holes 70 as discussed above. To release the compressed bias spring from the plunger after the cord has been threaded through the aligned holes of the cord closure, the plunger is depressed so that the resilient retaining member 80 engages the release means of the housing. In the exemplary embodiment, the stem is axially displaced toward the bore and the resilient prongs engage edges of the protruding portion 78 which urges the resilient prongs toward each other and permits the tapered end of the compressed bias spring to extend around the resilient prongs. FIG. 4 is a partial sectional view of an assembled cord closure according to the embodiment of FIG. 1 wherein the bias spring has been released from the plunger and is retained in compression between the closed end of the housing and the shoulder of the plunger body. After the bias spring has been released from the plunger, the plunger is biased away from the housing to engage and retain the cord 100 threaded through the holes of the cord closure. The cord is then engaged and securely retained between the saddle portion 27 of the engaging member 25 and the upper portion 74 of the holes in the housing as the compressed bias spring urges the plunger away from the housing. Subsequent axial depression of the plunger relative to the housing releases the cord to permit threading of the cord through the holes of the closure device, but does not result in the bias spring being retained in compression on the plunger since the release means of the housing deforms the resilient retaining member of the plunger as it passes through the tapered end of the bias spring.

While the foregoing written description of the invention enables any one skilled in the art to make and use what is at present considered to be the best mode of the invention, it will be appreciated and understood by those skilled in the art that there exists variations, modifications and equivalents within the spirit and scope of the specific exemplary embodiments disclosed herein. The present invention therefore is to be limited not by the specific exemplary embodiments disclosed herein, but by all of the embodiments within the scope of the appended claims.

What is claimed is:

1. A cord closure, comprising:

a housing having an open end, a surrounding side wall, and a closed end to form a cavity, said housing having a hole formed through opposite sides of said surrounding side wall;

a plunger having a body with a throughhole and a stem extending from a shoulder portion of said body, said stem having a resilient retaining member upon a distal end portion disposed away from said body; and a bias spring disposed in releasable compression about said stem of said plunger such that opposite ends of said bias spring are interposed between said shoulder portion of said body and said resilient retaining member upon said distal end portion of said stem with the end of said bias spring operatively associated with said distal end portion of said stem being disposed in direct contact with said resilient retaining member of said distal end portion of said stem;

wherein at least a portion of said body and said stem of said plunger is reciprocally disposable within said cavity of said housing so that said throughhole of said plunger is alignable with said holes formed through said opposite sides of said housing so as to permit threading of a cord through said aligned holes of said cord closure without said bias spring urging said plunger away from said housing until said bias spring is released from said resilient retaining member, whereby said bias spring urges said plunger away from said housing so as to engage and retain said cord threaded through said holes of said cord closure, upon depressing said plunger into said cavity of said housing.

2. The cord closure of claim 1 wherein the bias spring is a helical spring with at least one tapered end, the tapered end of the bias spring being seated on the resilient retaining member when the bias spring is releasably retained in compression on the plunger.

3. The cord closure of claim 1 wherein the resilient retaining member comprises a pair of resilient prongs extending from the distal end portion of the stem, the resilient prongs having a shoulder portion, wherein the bias spring is releasably retained in compression on the plunger between the shoulder portion of the body and the shoulder portion of the resilient prongs.

4. The cord closure of claim 3 wherein the bias spring is a helical spring with at least one tapered end, the tapered end of the bias spring being seated on the shoulder portion of the resilient prongs when the bias spring is releasably retained in compression on the plunger.

5. The cord closure of claim 3 further comprising release means disposed on the closed end of the housing cavity for engaging and flexing the resilient prongs so as to release the bias spring from the shoulder portion of the resilient prongs when the plunger is depressed into the cavity of the housing, wherein the released bias spring is retained in compression between the shoulder portion of the body and the closed end of the housing cavity so as to urge the plunger away from the housing.

6. The cord closure of claim 5 wherein the bias spring is a helical spring with at least one tapered end, the tapered end of the bias spring being seated on the shoulder portion of the resilient prongs when the biasing spring is releasably retained in compression on the plunger, and the tapered end of the bias spring being seated on the closed end of the housing cavity when the released bias spring is retained in compression between the shoulder portion of the body and the closed end of the housing cavity so as to urge the plunger away frown the housing.

7. The cord closure of claim 6, wherein: said resilient prongs each have a bevelled outer side portion; and said release means comprises a bore, with edge portions, defined within said closed end of said housing wherein said edge portions of said bore engage said bevelled outer side portions of said resilient prongs and urge said prongs toward each other so as to release said bias spring from said shoulder portions of said resilient prongs when said plunger is depressed into said cavity of said housing.

8. The cord closure of claim 7, wherein:

said release means further comprises a protruding portion about at least a portion of the circumference of said bore for engaging said bevelled outer side portions of said resilient prongs so as to urge said prongs toward each other so as to release said bias spring from said shoulder portions of said resilient prongs when said plunger is depressed into said cavity of said housing.

9. The cord closure of claim 7 wherein the resilient prongs each include a flange on an inner portion of its shoulder, the flanges aligning the bias spring on the shoulder portions of the resilient prongs when the bias spring is retained in compression on the plunger.

10. The cord closure of claim 1 further comprising release means disposed in the closed end of the housing for engaging the resilient retaining member so as to release the bias spring from the resilient retaining member when the plunger is depressed into the cavity of the housing.

11. The cord closure as set forth in claim 1, further comprising:

saddle means operatively associated with said plunger throughhole for centering said cord when said cord is secured within said cord closure.

12. A cord closure, comprising:

a housing having an open end, an annular side wall, and a closed end so as to form an internal cavity, said annular side wall having holes formed through opposite sides thereof;

a plunger comprising a body having a throughhole defined therethrough and a stem portion extending from a shoulder portion of said body wherein said stem portion has resilient retaining means formed upon a distal end portion disposed remote from said body;

spring means disposed in releasable compression about said stem portion of said plunger, with opposite ends of said spring means being interposed between said shoulder portion of said body and said resilient retaining means of said stem portion and with the end of said spring means operatively associated with said distal end portion of said stem portion of said plunger being disposed in direct contact with said resilient retaining means of said stem portion of said plunger, for permitting said plunger to be partially disposed within said cavity of said housing so as to permit said throughhole of said plunger to be aligned with said holes of said annular sidewall of said housing and thereby permit a cord to be threaded through said aligned holes of said housing and said plunger without said spring means biasing said plunger out of said cavity of said housing, and for biasing said plunger out of said cavity of said housing whereby said holes of said housing and said plunger are out of alignment such that said cord is retained within said cord closure when said end of said spring means operatively associated with said resilient retaining means is released from said resilient retaining means; and release means provided within said closed end of said housing for engaging said resilient retaining means of said stem portion of said plunger for causing said resilient retaining means to release said end of said spring means operatively associated and releasably engaged with said resilient retaining means of said stem portion of said plunger when said plunger is depressed into said cavity of said housing.

13. The cord closure as set forth in claim 12, wherein:

said end of said spring means operatively associated and releasably engaged with said resilient retaining means of said stem portion of said plunger is tapered radially inwardly so as to permit said end of said spring means to be seated upon said resilient retaining means.

14. The cord closure as set forth in claim 12, wherein:

said spring means comprises a helical spring.

15. The cord closure as set forth in claim 12, wherein:

said resilient retaining means comprises a pair of radially inwardly compressible resilient prongs.

16. The cord closure as set forth in claim 15, wherein:

each one of said prongs comprises a shoulder portion for seating a portion of said spring means.

17. The cord closure as set forth in claim 15, wherein:

said release means comprises a bore defined within said closed end of said housing, annular edge portions of said bore engaging said resilient prongs so as to force said resilient prongs radially inwardly as said plunger is depressed axially into said housing cavity.

18. The cord closure as set forth in claim 12, further comprising:

saddle means operatively associated with said throughhole of said plunger for centering said cord when said cord is secured within said cord closure.

* * * * *